(12) United States Patent
Geng et al.

(10) Patent No.: US 11,312,866 B2
(45) Date of Patent: Apr. 26, 2022

(54) SUPERHYDROPHOBIC COATING, SUPERHYDROPHOBIC FOAM CONCRETE, AND PREPARATION METHODS THEREOF

(71) Applicant: Qingdao University of Technology, Qingdao (CN)

(72) Inventors: Yongjuan Geng, Qingdao (CN); Shaochun Li, Qingdao (CN); Dongshuai Hou, Qingdao (CN); Zuquan Jin, Qingdao (CN); Xu Chen, Qingdao (CN); Qilong Xiao, Qingdao (CN); Weifeng Zhang, Qingdao (CN); Dongyi Lei, Qingdao (CN); Jing Gao, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 61 days.

(21) Appl. No.: 16/850,141

(22) Filed: Apr. 16, 2020

(65) Prior Publication Data
US 2021/0198497 A1 Jul. 1, 2021

(30) Foreign Application Priority Data
Dec. 30, 2019 (CN) .......................... 201911391839.1

(51) Int. Cl.
C09D 5/02 (2006.01)
C04B 38/00 (2006.01)
C09D 5/00 (2006.01)
C04B 103/48 (2006.01)
C04B 103/65 (2006.01)

(52) U.S. Cl.
CPC .......... C09D 5/022 (2013.01); C04B 38/0093 (2013.01); C09D 5/00 (2013.01); C04B 2103/48 (2013.01); C04B 2103/65 (2013.01)

(58) Field of Classification Search
None
See application file for complete search history.

(56) References Cited

U.S. PATENT DOCUMENTS 5,895,713 A * 4/1999 Miyazaki .............. C03C 17/009
428/335

FOREIGN PATENT DOCUMENTS

CN 103436165 A * 12/2013
CN 105366985 A 3/2016

OTHER PUBLICATIONS

Cui, D et al., Waterproof Staining-Resisting Nano Composite Coating, Dec. 11, 2013, machine translation of CN 103436165 (Year: 2013).*

* cited by examiner

Primary Examiner — Chinessa T. Golden
(74) Attorney, Agent, or Firm — Wood Herron & Evans LLP

(57) ABSTRACT

A superhydrophobic coating is provided and contains organosilane, an inorganic nanomaterial, and an emulsifying agent. A mass proportion of the components is controlled, so that the superhydrophobic coating can form a micro-nano mixed microstructure inside foam concrete. The organosilane first forms dense hydrophobic surface layers on the surface and in inner pores of the foam concrete, and the nanomaterial forms uniformly distributed nano-bulges on the hydrophobic surface layers formed by the silane. The superhydrophobic performance of the foam concrete can be effectively improved by combining the two microstructures. The foam concrete exhibits excellent superhydrophobic performance.

20 Claims, No Drawings

SUPERHYDROPHOBIC COATING, SUPERHYDROPHOBIC FOAM CONCRETE, AND PREPARATION METHODS THEREOF

CROSS-REFERENCE TO RELATED APPLICATION

This application claims priority to Chinese Patent Application No. CN 201911391839.1, filed Dec. 30, 2019. The above-mentioned patent application is incorporated herein by reference in its entirety.

TECHNICAL FIELD

The present invention relates to superhydrophobic materials, and in particular, to a superhydrophobic coating that may be used in forming a superhydrophobic foam concrete, as well as preparation methods of these elements.

BACKGROUND

Foam concrete is prepared by introducing a specific amount of air bubbles into ordinary concrete, and has a relatively large quantity of pores and relatively light weight. In addition, these pores can reduce heat and sound transmission. Therefore, foam concrete has such advantages as light weight, heat preservation, thermal insulation, fire resistance, shock absorption, and sound absorption. Due to the foregoing advantages, foam concrete has been widely used in building energy conservation, building weight reduction, etc. Foam concrete can absorb water very easily due to its dense pore distribution and relatively large pore diameter. As a result, the performance of the foam concrete is affected, thereby affecting the structure durability. Therefore, if the waterproof performance of foam concrete can be further improved, the durability of a building structure can be effectively improved. This can realize environmental protection and energy conservation and prolong the service life of buildings.

Applying a waterproofing coating on the surface of foam concrete can effectively improve the waterproof performance of foam concrete. Silane is a type of commonly used permeable waterproof material. It can penetrate into the concrete surface at a certain depth and reacts with concrete to form a waterproof layer, achieving good waterproof performance and anti-permeability. In addition, silane does not block inner pores of foam concrete, and has little impact on the density, thermal conductivity, and other performance parameters of the foam concrete. However, the current research and actual application results show that a waterproof effect of silane is still unsatisfactory and foam concrete treated by silane still has relatively high water absorption.

The Chinese Patent Publication No. CN 105366985 discloses a nano-reinforcing agent for foam concrete, which is prepared by mixing silica sol, alumina sol, and a silane coupling agent. After the reinforcing agent prepared according to the patent is used to impregnate foam concrete, the hydrophobic performance of the foam concrete can be improved, but an application effect thereof is still unsatisfactory.

As such, it would be desirable to provide a superhydrophobic coating that addresses these and other deficiencies of known designs.

SUMMARY

In accordance with embodiments of the invention, a superhydrophobic coating is provided. A surface static contact angle of superhydrophobic foam concrete prepared from the superhydrophobic coating provided in such embodiments is between 158° and 175°; a sliding angle thereof is between 5° and 10°; and water absorption thereof is less than 6%. Therefore, the foam concrete exhibits excellent superhydrophobic performance.

In one embodiment, the present invention provides a superhydrophobic coating, including the following components in parts by weight: 40-70 parts of organosilane, 10-40 parts of inorganic nanomaterial, 5-15 parts of emulsifying agent, and 10-50 parts of water.

Preferably, the organosilane includes one or more of triethoxyvinylsilane, isobutyltriethoxysilane, triethoxyoctylsilane, γ-aminopropyl triethoxysilane, and N-(2-aminoethyl)-3-aminopropyltriethoxysilane.

Preferably, the inorganic nanomaterial includes one or more of silica, alumina, γ-alumina, titanium oxide, graphene, oxidized graphene, silica sol, alumina sol, and titanium sol; and a particle size of the inorganic nanomaterial is 20-300 nm.

Preferably, the emulsifying agent includes one or more of Peregal O, Span 80, Span 60, Tween 60, and Tween 80.

In another embodiment, the present invention further provides a preparation method of the above-described superhydrophobic coating, including the following steps: conducting first mixing on the organosilane, the emulsifying agent, and the water to obtain silane-water emulsion; and conducting second mixing on the inorganic nanomaterial and the silane-water emulsion to obtain the superhydrophobic coating.

Preferably, the temperature of the first mixing and the second mixing is independently 40-70° C.; the time for the first mixing is 110-330 min; and the time for the second mixing is 20-60 min.

Preferably, the first mixing and the second mixing are independently conducted under stirring, and a stirring speed is independently 3000-8000 r/min.

In a further embodiment, the present invention further provides use of the above superhydrophobic coating or a superhydrophobic coating prepared by using the above preparation method in the preparation of superhydrophobic foam concrete.

In yet another embodiment, the present invention further provides superhydrophobic foam concrete, including foam concrete and a superhydrophobic coating, where the superhydrophobic coating is the above superhydrophobic coating or a superhydrophobic coating prepared by using the above preparation method; and a coating amount of the superhydrophobic coating is 600-1500 g/m$^2$.

In one embodiment, the present invention further provides a preparation method of the above superhydrophobic foam concrete, including the following step: coating the superhydrophobic coating on the surface of the foam concrete, and conducting standing to obtain the superhydrophobic foam concrete.

The superhydrophobic coating provided in the present invention includes the following components in parts by weight: 40-70 parts of organosilane, 10-40 parts of inorganic nanomaterial, 5-15 parts of emulsifying agent, and 10-50 parts of water. Compared with the prior designs, the superhydrophobic coating provided in the present invention contains organosilane, an inorganic nanomaterial, and an emulsifying agent. A mass proportion of the components is controlled, so as to obtain a highly dispersed and homogeneous organosilane-inorganic nanomaterial composite emulsion system. In this way, the superhydrophobic coating can form a micro-nano mixed microstructure inside foam concrete. The emulsified organosilane first forms dense hydrophobic surface layers on the surface and in inner pores of the foam concrete. The hydrophobic surface layers have stable hydrophobic performance and are non-volatile. In addition, the inorganic nanomaterial forms uniformly distributed nano-bulges on the hydrophobic surface layers formed by the silane. The superhydrophobic performance of the foam concrete can be effectively improved by combining the two microstructures. Results of embodiments show that, a surface static contact angle of foam concrete prepared by the superhydrophobic coating provided in the present invention is between 158° and 175°; a sliding angle thereof is between 5° and 10°; and water absorption thereof is less than 6%. Compared with foam concrete that is not treated with the superhydrophobic coating, the water absorption of the foam concrete in the present invention is decreased by more than 65.6%. Therefore, the foam concrete in the present invention has excellent superhydrophobic performance.

DETAILED DESCRIPTION

The present invention provides a superhydrophobic coating, including the following components in parts by weight: 40-70 parts of organosilane, 10-40 parts of inorganic nanomaterial, 5-15 parts of emulsifying agent, and 10-50 parts of water.

The superhydrophobic coating in the present invention includes (in parts by weight) 40-70 parts and preferably 45-60 parts of the organosilane. In the present invention, the organosilane preferably includes one or more of triethoxyvinylsilane, isobutyltriethoxysilane, triethoxyoctylsilane, γ-aminopropyl triethoxysilane, and N-(2-aminoethyl)-3-aminopropyltriethoxysilane. In the present invention, when the organosilane is preferably more than two of the foregoing provided specific substances, there is no special limitation on a proportion of selected specific substances in the present invention, and these specific substances can be mixed according to any proportion. In the present invention, there is no special requirement on a source of the organosilane, and a commercially available product well known to a person skilled in the art can be used.

In the present invention, after the organosilane is emulsified by the emulsifying agent, the organosilane can form uniform dense hydrophobic surface layers on the surface and in inner pores of foam concrete when being in contact with the foam concrete. The hydrophobic surface layers have stable hydrophobic performance, are non-volatile, and improve the hydrophobic performance of the foam concrete.

Based on the parts by weight of the organosilane, the superhydrophobic coating in the present invention includes 10-40 parts and preferably 10-30 parts of the inorganic nanomaterial. In the present invention, a particle size of the inorganic nanomaterial is preferably 20-300 nm and is further preferably 30-200 nm. In the present invention, the inorganic nanomaterial preferably includes one or more of silica, alumina, γ-alumina, titanium oxide, graphene, oxidized graphene, silica sol, alumina sol, and titanium sol. In the present invention, when the inorganic nanomaterial is preferably one or more of silica sol, alumina sol, and titanium sol, the solid content of the silica sol, alumina sol, and titanium sol is preferably 10-50% and is further preferably 20-45%. In the present invention, when the inorganic nanomaterial is preferably more than two of the foregoing provided specific substances, there is no special limitation on a proportion of selected specific substances in the present invention, and these specific substances can be mixed according to any proportion. In the present invention, there is no special requirement on a source of the inorganic nanomaterial, and a commercially available product well known to a person skilled in the art can be used.

In the present invention, the inorganic nanomaterial can form uniformly distributed nano-bulges on dense hydrophobic surface layers formed by the organosilane, so as to enhance the hydrophobic capability of the hydrophobic surface layers, improving the hydrophobic performance of foam concrete.

Based on the parts by weight of the organosilane, the superhydrophobic coating in the present invention includes 5-15 parts and preferably 5-10 parts of the emulsifying agent. In the present invention, the emulsifying agent preferably includes one or more of Peregal O, Span 80, Span 60, Tween 60, and Tween 80. When the emulsifying agent is more than two of the foregoing provided specific substances, there is no special limitation on a proportion of selected specific substances in the present invention, and these specific substances can be mixed according to any proportion. In an embodiment of the present invention, the emulsifying agent specifically preferably includes Peregal O and Span 80; a mass ratio of the Peregal O to the Span 80 is preferably 3:1-1:3 and is further preferably 2:1-1:2. There is no special requirement on a source of the emulsifying agent in the present invention, and a commercially available product well known to a person skilled in the art can be used.

In the present invention, the emulsifying agent can make the organosilane form a uniformly dispersed "oil-in-water" system in water, improving the dispersibility and stability of the superhydrophobic coating.

Based on the parts by weight of the organosilane, the superhydrophobic coating in the present invention includes 10-50 parts of water, and the water is preferably deionized water. There is no special requirement on a source of the water in the present invention, and a commercially available product well known to a person skilled in the art can be used.

The present invention further provides a preparation method of the superhydrophobic coating in the foregoing technical solution, including the following steps: conducting first mixing on the organosilane, the emulsifying agent, and the water to obtain silane-water emulsion; and conducting second mixing on the inorganic nanomaterial and the silane-water emulsion to obtain the superhydrophobic coating.

In the present invention, first mixing is conducted on the organosilane, the emulsifying agent, and the water to obtain silane-water emulsion.

In the present invention, the first mixing preferably includes the following steps: pre-mixing the organosilane and part of the emulsifying agent to obtain silane emulsion; preliminarily mixing the water with the remaining emulsifying agent to obtain water emulsion; and finally mixing the pre-mixed emulsion with the preliminarily mixed emulsion to obtain silane-water emulsion.

In the present invention, the pre-mixing temperature is preferably 40-70° C. and is further preferably 50° C.; and the pre-mixing time is preferably 60-240 min and is further preferably 80-200 min. In the present invention, the pre-mixing is preferably conducted under stirring; a stirring speed is preferably 3000-8000 r/min and is further preferably 3500-7500 r/min; and the stirring is preferably mechanical stirring.

In the present invention, a mass ratio of the organosilane to the part of the emulsifying agent is preferably 30:1-5:1 and is further preferably 15:1-6:1.

In the present invention, a mass ratio of the part of the emulsifying agent to the remaining emulsifying agent is preferably 2:1-1:2.

In the present invention, the preliminary mixing temperature is preferably 40-70° C. and is further preferably 50° C.; and the preliminary mixing time is preferably 20-60 min and is further preferably 30-50 min. In the present invention, the preliminary mixing is preferably conducted under stirring; a stirring speed is preferably 3000-8000 r/min and is further preferably 3500-7500 r/min; and the stirring is preferably mechanical stirring.

In the present invention, a mass ratio of the water to the remaining emulsifying agent is preferably 10:1-1:1 and is further preferably 8:1-2:1.

In the present invention, the final mixing process preferably includes dropwise adding the pre-mixed emulsion to the preliminarily mixed emulsion for mixing, where a dropping speed is 2-5 mL/min and is further preferably 3-4 mL/min.

In the present invention, the final mixing temperature is preferably 40-70° C. and is further preferably 50-60° C.; the time after the adding operation is completed is preferably used as a start time of the final mixing; and the final mixing time is preferably 20-60 min and is further preferably 30 min. In the present invention, the final mixing is preferably conducted under stirring; a stirring speed is preferably 3000-8000 r/min and is further preferably 3500-7500 r/min; and the stirring is preferably mechanical stirring.

In the present invention, the emulsifying agent can be in full contact with the organosilane through first mixing to emulsify the organosilane, so that the emulsified organosilane can form a highly dispersed and homogeneous silane-water emulsion system in water.

In the present invention, after the silane-water emulsion is obtained, second mixing is conducted on the inorganic nanomaterial and the silane-water emulsion to obtain the superhydrophobic coating.

In the present invention, when the inorganic nanomaterial is one or more of nano silica, nano alumina, γ-alumina, nano titanium oxide, graphene, and oxidized graphene, the inorganic nanomaterial is preferably subject to second mixing with the silane-water emulsion in a form of dispersion; a dispersion medium of the dispersion is preferably water; and the solid content of the dispersion is preferably 20-50% and is further preferably 30-40%. When the inorganic nanomaterial is one or more of silica sol, alumina sol, and titanium sol, the solid content of the silica sol, the alumina sol, and the titanium sol is preferably 10-50% and is further preferably 20-45%.

In the present invention, the second mixing process preferably includes: dropwise adding the inorganic nanomaterial to the silane-water emulsion for mixing. Specifically, when the inorganic nanomaterial is one or more of nano silica, nano alumina, γ-alumina, nano titanium oxide, graphene, and oxidized graphene, the second mixing process preferably includes: dropwise adding the dispersion of the inorganic nanomaterial to the silane-water emulsion; and when the inorganic nanomaterial is one or more of silica sol, alumina sol, and titanium sol, the second mixing process preferably includes: dropwise adding the inorganic nanomaterial to the silane-water emulsion. The dropping rate is preferably 5-10 mL/min and is further preferably 6-9 mL/min.

In the present invention, the second-mixing temperature is preferably 40-70° C. and is further preferably 50-60° C.; the second-mixing time is preferably 20-60 min after the adding operation is completed and is further preferably 30-50 min. In the present invention, the second mixing is preferably conducted under stirring; a stirring speed is preferably 3000-8000 r/min and is further preferably 3500-7500 r/min; and the stirring is preferably mechanical stirring.

The present invention provides use of the superhydrophobic coating in the foregoing technical solution in the preparation of superhydrophobic foam concrete.

The present invention provides superhydrophobic foam concrete, where the superhydrophobic foam concrete includes a foam concrete substrate and the superhydrophobic coating in the foregoing technical solution.

In the present invention, a coating amount of the superhydrophobic coating in the superhydrophobic foam concrete is preferably 600-1500 $g/m^2$. The foam concrete is preferably Portland cement foam concrete or sulphoaluminate cement foam concrete.

The present invention provides a preparation method of the superhydrophobic foam concrete, including the following step: coating the superhydrophobic coating on the surface of the foam concrete, and conducting standing to obtain the superhydrophobic foam concrete.

In the present invention, the coating method is preferably any one of brush coating, spraying, roll coating, and impregnation. There is no special limitation on a specific process of brush coating, spraying, roll coating, and impregnation in the present invention, and a process well known to a person skilled in the art can be used. In the present invention, the standing time is preferably 24-72 h.

For better understanding of the present invention, the content of the present invention is further illuminated below with reference to embodiments. However, the content of the present invention is not limited to the following embodiments.

Embodiment 1

Preparation of a superhydrophobic coating 60 g of isobutyltriethoxysilane was mixed with 5 g of Peregal O at 50° C. for 3 h to obtain silane emulsion, where a stirring speed was controlled at 5000 r/min; 10 g of deionized water was mixed with 5 g of Span 80 at 50° C. for 30 min to obtain water emulsion, where a stirring speed was controlled at 6000 r/min; the pre-mixed emulsion was dropwise added to the preliminarily mixed emulsion at a dropping speed of 2 mL/min, where the temperature was controlled at 50° C., and a stirring speed was controlled at 5000 r/min; and after all the pre-mixed emulsion was completely dropwise added, mixing and stirring was continued for 30 min to obtain silane-water emulsion; and 20 g of silica sol (100 nm, with solid content of 40%) was dropwise added to the silane-water emulsion at a dropping speed of 8 mL/min, where the temperature was controlled at 60° C., and a stirring speed was controlled at 6000 r/min; and after all the silica sol was completely dropwise added, stirring was continued for 50 min to obtain the superhydrophobic coating.

Preparation of superhydrophobic foam concrete. The superhydrophobic coating was coated on the surface of foam concrete by impregnation, and stood for 24 h to obtain the superhydrophobic foam concrete.

A surface static contact angle of the foam concrete is 165°; a sliding angle thereof is 6°; and water absorption per volume thereof is 4.2%. Before being coated with the superhydrophobic coating, water absorption per volume of the foam concrete is 15.1%. Compared with the foam concrete that is not treated with the superhydrophobic coating, the water absorption of the foam concrete in this embodiment was decreased by 72.2%. After cured for 3-7 days, the superhydrophobic performance of the superhydrophobic foam concrete did not change significantly.

Embodiment 2

Preparation of a superhydrophobic coating 50 g of triethoxyoctylsilane was mixed with 5 g of Peregal O at 50° C. for 2 h to obtain silane emulsion, where a stirring speed was controlled at 6000 r/min; 20 g of deionized water was mixed with 5 g of Span 80 at 50° C. for 50 min to obtain water emulsion, where a stirring speed was controlled at 5000 r/min; the pre-mixed emulsion was dropwise added to the preliminarily mixed emulsion at a dropping speed of 2 mL/min, where the temperature was controlled at 60° C., and a stirring speed was controlled at 6000 r/min; and after all the pre-mixed emulsion was completely dropwise added, mixing and stirring was continued for 30 min to obtain silane-water emulsion; and 20 g of oxidized graphene dispersion (80 nm, 30 wt %) was dropwise added to the silane-water emulsion at a dropping speed of 5 mL/min, where the temperature was controlled at 70° C., and a stirring speed was controlled at 7000 r/min; and after all the oxidized graphene dispersion was completely dropwise added, stirring was continued for 60 min to obtain the superhydrophobic coating.

Preparation of superhydrophobic foam concrete. The superhydrophobic coating was brush coated on the surface of foam concrete, and stood for 24 h to obtain the superhydrophobic foam concrete. A surface static contact angle of the foam concrete is 170°; a sliding angle thereof is 5°; and water absorption per volume thereof is 4.0%. Before being coated with the superhydrophobic coating, water absorption per volume of the foam concrete is 15.2%. Compared with the foam concrete that is not treated with the superhydrophobic coating, the water absorption of the foam concrete in this embodiment was decreased by 73.7%. After cured for 3-7 days, the superhydrophobic performance of the superhydrophobic foam concrete did not change significantly.

Embodiment 3

Preparation of a superhydrophobic coating 55 g of triethoxyvinylsilane was mixed with 4 g of Peregal O at 50° C. for 3 h to obtain silane emulsion, where a stirring speed was controlled at 7000 r/min; 14 g of deionized water was mixed with 2 g of Span 80 at 50° C. for 60 min to obtain water emulsion, where a stirring speed was controlled at 4000 r/min; the pre-mixed emulsion was dropwise added to the preliminarily mixed emulsion at a dropping speed of 4 mL/min, where the temperature was controlled at 40° C., and a stirring speed was controlled at 7000 r/min; and after all the pre-mixed emulsion was completely dropwise added, mixing and stirring was continued for 30 min to obtain silane-water emulsion; and 25 g of alumina sol (150 nm, with solid content of 35%) was dropwise added to the silane-water emulsion at a dropping speed of 6 mL/min, where the temperature was controlled at 60° C., and a stirring speed was controlled at 4000 r/min; and after all the alumina sol was completely dropwise added, stirring was continued for 50 min to obtain the superhydrophobic coating.

Preparation of superhydrophobic foam concrete. The superhydrophobic coating was coated on the surface of foam concrete by impregnation, and stood for 24 h to obtain the superhydrophobic foam concrete. A surface static contact angle of the foam concrete is 155°; a sliding angle thereof is 8°; and water absorption per volume thereof is 5.4%. Before being coated with the superhydrophobic coating, water absorption per volume of the foam concrete is 15.7%. Compared with the foam concrete that is not treated with the superhydrophobic coating, the water absorption of the foam concrete in this embodiment was decreased by 65.6%. After cured for 3-7 days, the superhydrophobic performance of the superhydrophobic foam concrete did not change significantly.

Embodiment 4

Preparation of a superhydrophobic coating 45 g of γ-aminopropyl triethoxysilane was mixed with 4 g of Peregal O at 50° C. for 4 h to obtain silane emulsion, where a stirring speed was controlled at 5500 r/min; 17 g of deionized water was mixed with 4 g of Span 80 at 50° C. for 30 min to obtain water emulsion, where a stirring speed was controlled at 4000 r/min; the pre-mixed emulsion was dropwise added to the preliminarily mixed emulsion at a dropping speed of 5 mL/min, where the temperature was controlled at 55° C., and a stirring speed was controlled at 6500 r/min; and after all the pre-mixed emulsion was completely dropwise added, mixing and stirring was continued for 30 min to obtain silane-water emulsion; and 39 g of silica (100 nm, 40 wt %) was dropwise added to the silane-water emulsion at a dropping speed of 8 mL/min, where the temperature was controlled at 55° C., and a stirring speed was controlled at 7000 r/min; and after all the silica was completely dropwise added, stirring was continued for 40 min to obtain the superhydrophobic coating.

Preparation of superhydrophobic foam concrete. The superhydrophobic coating was roll coated on the surface of foam concrete, and stood for 24 h to obtain the superhydrophobic foam concrete. A surface static contact angle of the foam concrete is 165°; a sliding angle thereof is 6°; and water absorption per volume thereof is 4.5%. Before being coated with the superhydrophobic coating, water absorption per volume of the foam concrete was 16.1%. Compared with the foam concrete that is not treated with the superhydrophobic coating, the water absorption of the foam concrete in this embodiment was decreased by 72.0%. After cured for 3-7 days, the superhydrophobic performance of the superhydrophobic foam concrete did not change significantly.

The foregoing descriptions are merely preferred implementations of the present invention rather than limitations on the present invention in any form. It should be pointed out that for a person of ordinary skilled in the art, several improvements and modifications may further be made without departing from the principle of the present invention, and the improvements and modifications should also be considered to fall within the protection scope of the present invention.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A superhydrophobic coating, comprising the following components in parts by weight:
    40-70 parts of organosilane,
    10-40 parts of inorganic nanomaterial,
    5-15 parts of emulsifying agent, and 10-50 parts of water,
wherein a particle size of the inorganic nanomaterial is 80-300 nm.

2. The superhydrophobic coating of claim 1, wherein the organosilane comprises at least one of: triethoxyvinylsilane, isobutyltriethoxysilane, triethoxyoctylsilane, γ-aminopropyl triethoxysilane, and N-(2-aminoethyl)-3-aminopropyltriethoxysilane.

3. The superhydrophobic coating of claim 1, wherein the inorganic nanomaterial comprises at least one of: silica, alumina, γ-alumina, titanium oxide, graphene, oxidized graphene, silica sol, alumina sol, and titanium sol.

4. The superhydrophobic coating of claim 1, wherein the emulsifying agent comprises at least one of Peregal O, Span 80, Span 60, Tween 60, and Tween 80.

5. A superhydrophobic foam concrete, comprising:
foam concrete, and
a superhydrophobic coating, which includes the following components in parts by weight: 40-70 parts of organosilane, 10-40 parts of inorganic nanomaterial, 5-15 parts of emulsifying agent, and 10-50 parts of water, wherein a particle size of the inorganic nanomaterial is 80-300 nm,
wherein a coating amount of the superhydrophobic coating is 600-1500 g/m$^2$.

6. A preparation method for making a superhydrophobic coating, which includes the following components in parts by weight: 40-70 parts of organosilane, 10-40 parts of inorganic nanomaterial, 5-15 parts of emulsifying agent, and 10-50 parts of water, the method comprising the following steps:
conducting first mixing on the organosilane, the emulsifying agent, and the water to obtain a silane-water emulsion; and
conducting second mixing on the inorganic nanomaterial, which defines a particle size of 80-300 nm, and the silane-water emulsion to obtain the superhydrophobic coating.

7. The preparation method of claim 6, wherein the organosilane comprises at least one of: triethoxyvinylsilane, isobutyltriethoxysilane, triethoxyoctylsilane, γ-aminopropyl triethoxysilane, and N-(2-aminoethyl)-3-aminopropyltriethoxysilane.

8. The preparation method of claim 7, wherein a temperature of the first mixing and the second mixing is independently 40-70° C.; a time for the first mixing is 110-330 min; and a time for the second mixing is 20-60 min.

9. The preparation method of claim 8, wherein the first mixing and the second mixing are independently conducted under stirring, and a stirring speed is independently 3000-8000 r/min.

10. The preparation method of claim 6, wherein the inorganic nanomaterial comprises at least one of: silica, alumina, γ-alumina, titanium oxide, graphene, oxidized graphene, silica sol, alumina sol, and titanium sol.

11. The preparation method of claim 10, wherein a temperature of the first mixing and the second mixing is independently 40-70° C.; a time for the first mixing is 110-330 min; and a time for the second mixing is 20-60 min.

12. The preparation method of claim 11, wherein the first mixing and the second mixing are independently conducted under stirring, and a stirring speed is independently 3000-8000 r/min.

13. The preparation method of claim 6, wherein the emulsifying agent comprises at least one of Peregal O, Span 80, Span 60, Tween 60, and Tween 80.

14. The preparation method of claim 13, wherein a temperature of the first mixing and the second mixing is independently 40-70° C.; a time for the first mixing is 110-330 min; and a time for the second mixing is 20-60 min.

15. The preparation method of claim 14, wherein the first mixing and the second mixing are independently conducted under stirring, and a stirring speed is independently 3000-8000 r/min.

16. The preparation method of claim 6, wherein a temperature of the first mixing and the second mixing is independently 40-70° C.; a time for the first mixing is 110-330 min; and a time for the second mixing is 20-60 min.

17. The preparation method of claim 16, wherein the first mixing and the second mixing are independently conducted under stirring, and a stirring speed is independently 3000-8000 r/min.

18. The preparation method of claim 6, wherein the first mixing and the second mixing are independently conducted under stirring, and a stirring speed is independently 3000-8000 r/min.

19. The preparation method of claim 6, wherein the method is further used to prepare a superhydrophobic foam concrete, and the method further comprises:
coating the superhydrophobic coating onto foam concrete with a coating amount of 600-1500 g/m$^2$ to form the superhydrophobic foam concrete.

20. The preparation method of claim 19, further comprising:
coating the superhydrophobic coating on a surface of the foam concrete, and conducting standing to obtain the superhydrophobic foam concrete.

* * * * *